United States Patent [19]

Mackley

[11] 4,154,105

[45] May 15, 1979

[54] ORIENTABLE TEMPERATURE INDICATOR DEVICE

[76] Inventor: Frank H. Mackley, 19262 Congress Cir., Huntington Beach, Calif. 92647

[21] Appl. No.: 872,579

[22] Filed: Jan. 26, 1978

[51] Int. Cl.² .......................... G01K 1/14; G01F 23/04
[52] U.S. Cl. ................................. 73/346; 33/126.7 R; 73/292; 73/343 B; 180/33 R
[58] Field of Search ...................... 73/349, 346, 343 B, 73/292, 347, 348; 184/1 C; 340/57, 59; 33/126.7; 180/33 R

[56] References Cited

U.S. PATENT DOCUMENTS

| 1,781,512 | 11/1930 | Holt | 73/346 |
|---|---|---|---|
| 3,274,691 | 9/1966 | Bolles | 73/292 |
| 3,626,596 | 12/1971 | Manke | 33/126.7 R |
| 3,845,661 | 11/1974 | Hollweck et al. | 73/349 |
| 3,873,446 | 3/1975 | Campbell | 73/343 B |

FOREIGN PATENT DOCUMENTS 352218  7/1931  United Kingdom ................. 180/33 R

OTHER PUBLICATIONS

EMPI Dealer Catalog, a publication of Engineered Motor Products, Riverside, CA 92502, p. N3.

Primary Examiner—S. Clement Swisher
Attorney, Agent, or Firm—Harold C. Weston

[57] ABSTRACT

A temperature indicator device, used for continuously monitoring the condition of lubricating oil of motorcycles and recreation vehicles, comprises a temperature sensor stem having a calibrated readout gauge, which gauge is orientable about the stem axis in a cover element of the lubricating oil reservoir.

6 Claims, 6 Drawing Figures

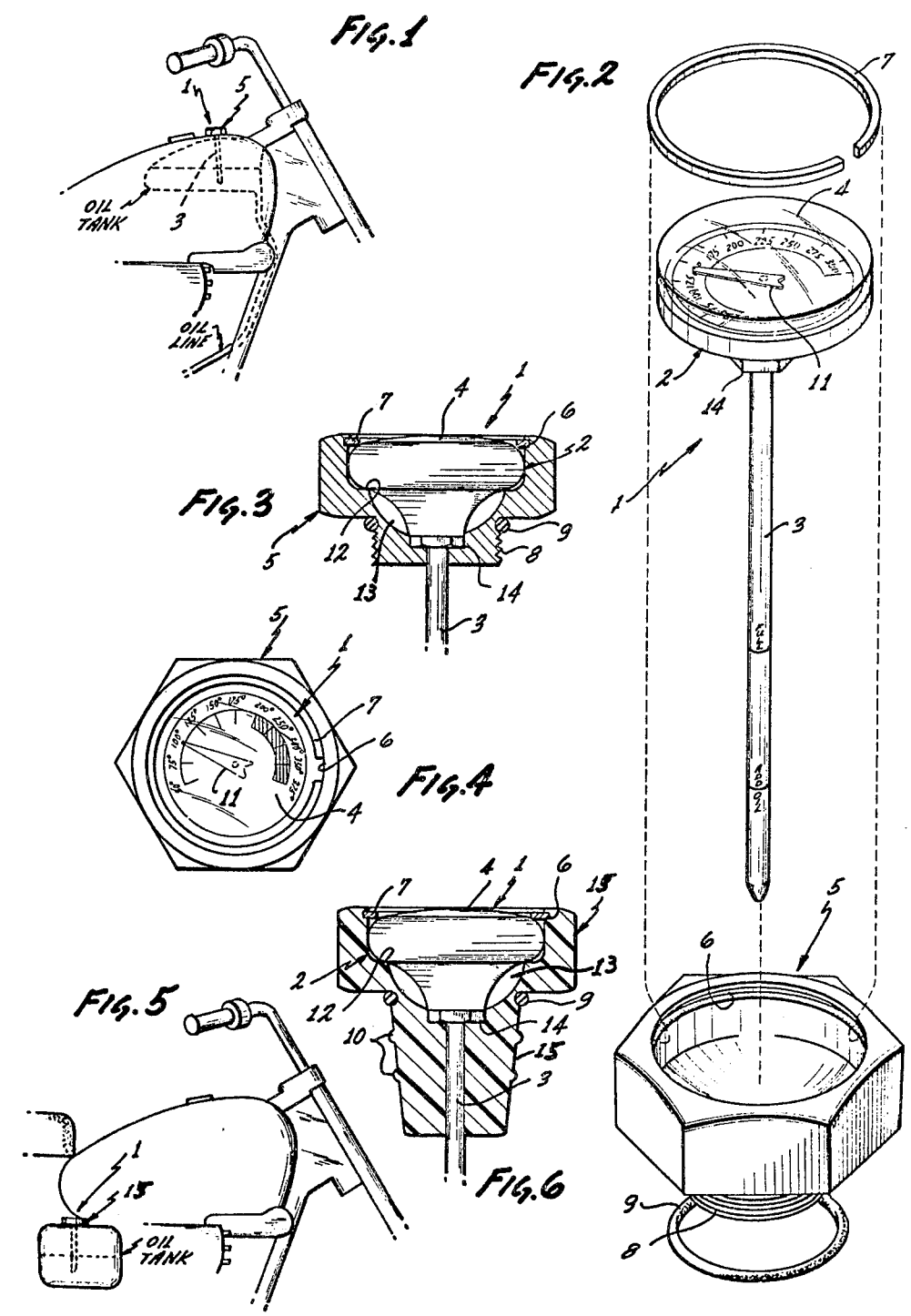

ORIENTABLE TEMPERATURE INDICATOR DEVICE

BACKGROUND OF THE INVENTION

1. Field of the Invention

Off-street recreational vehicles have come of age in the United States and millions of Americans have adopted cross-country motorcycle races and dune buggy rallies as their favorite weekend pastimes. This invention relates to engine instrumentation for such off-street vehicles, and, more particularly, to a temperature gauge monitoring the condition of engine lubricating oil, providing the operator instantaneous information concerning its temperature.

Off-street vehicles generally operate in dusty and dry or muddy and wet environment during the activities with which they are used. Oftentimes, long inclines and rugged terrain require the engines to be operated in high stress modes which result in engine operating temperatures well in excess of those causing irreversible damage to engine components. The excitement and fervor of competition frequently leads the operator to ignore symptoms of these high temperature conditions and he is not made aware of the overstress condition until catastrophic failure of his machine occurs.

The device described herein provides the operator a visible, easily accessible and reliable engine temperature guage which measures the temperature of the lubricating oil and displays it on a readout dial, adjustable in orientation, for maximum visibility and utility to him.

2. Description of the Prior Art

Engine temperature monitors are old in the art. Thermocouples, pressure switches, freeze plugs and a large number of active and passive element arrays have been utilized to both monitor and control operation of internal combustion engines.

In the more common types of engine utilized for American family transportation and commercial operations, excess engine heat, unused by propulsion system elements, is carried away from sensitive engine components by liquid coolant, pumped through engine channels and cycled through radiator fins for elimination of that heat. To monitor the temperature of such engines, American auto manufacturers sometimes install simple bimetallic switches into coolant lines between the engine and its radiator, to alert the operator to overtemperature conditions by means of warning lamps or other alarms. Analog devices indicating actual degrees of coolant temperature have fallen out of favor with automobile producers but were quite common in older models which used a variety of sensors to provide stimuli to readout devices.

In motorcycles and other vehicles utilizing air cooled engines, no liquid is used to control engine temperatures and "coolant" lines are non existant. Excess heat is eliminated from these engines by means of radiating fins built into cylinder blocks and into the cylinder heads themselves. Flow of air around and over these fins transfers engine heat to the surrounding environment through convecture and radiative processes of various kinds.

It generally happens that most engine heat, for motorcycles and dune buggies, is generated when the vehicle is in a labored condition, slowed down by stresses and yet laboring for more power. Air flow over the engine, at these times, is minimal, and dangerous heat buildup occurs in engine components. This heat is transferred to as many cooler elements as possible, including the ambient air.

Principal among these cooler elements is the engine lubricating oil which is continuously cycled between its reservoir and the engine crankcase. While performing its lubricating task in the crankcase and valve sections, this oil is heated to the temperature of the engine components it lubricates and is pumped through lubricant circuits back to its reservoir.

Past patents have provided for engine lubricant monitor devices, (reference U.S. Pat. Nos. 1,399,534 (1921) and 3,693,448 (1972) but none has provided for the direct readout by an orientable indicator such as is presented herein.

Novelty and utility of the device proposed here resides in its combination of well known temperature sensor-dial readout principles with a means to allow orientation of the readout dial to a position allowing engine operators maximum visibility thereof for continuous monitoring of lubricating oil temperature.

OBJECTS OF THE INVENTION

Accordingly, it is an object of the present invention to provide an improved internal combustion engine operating condition gauge to provide continuous monitoring of the temperature of engine lubricating oil.

Another object of the invention is to provide a rugged, reliable means of monitoring engine lubricating oil temperature which means is adjustable in orientation to the convenience of the user.

Another object of the invention is to provide an improved oil dip-stick for motorcycles and off-street recreation vehicles, which includes a means for monitoring the temperature of the lubricant, gauged for quantity, by the dip-stick.

A still further object of the invention is to provide means for adaptation of an analog temperature indicator device to oil reservoir access ports of internal combustion engines.

BRIEF DESCRIPTION OF THE DRAWINGS

FIG. 1 is an elevational, partly phantom, view of the device of this invention installed on a motorcycle with oil reservoir near the operator's console.

FIG. 2 is an exploded view of the device of this invention.

FIG. 3 is a sectional view of one of the embodiments of this invention.

FIG. 4 is a top view of an indicator gauge typical of one used with this invention.

FIG. 5 is an elevational, partly phantom, view of the device of this invention installed on a motorcycle with its oil reservoir near the engine cylinder head.

FIG 6 is a sectional view of a second embodiment of this invention.

DETAILED DESCRIPTION OF THE INVENTION

The invention shown in the above referenced drawings is comprised of a unique combination of known elements. Engine oil temperature gauge 1 comprises a standard temperature sensor stem 3, the internal sensor of which is coupled mechanically to pointer 11 of indicator dial 4.

Stem 3 is coupled mechanically to indicator body 2 at junction 14. Indicator body 2 contains a dial 4 with easily read markings corresponding to degrees of temperature (appropriate scale of Fahrenheit or Celsius)

and pointer 11 which is mechanically coupled to the sensor of stem 3. Bimetallic sensors or extendible, temperature sensitive coils of stem 3 mechanically actuate pointer 11 to the indication or marking corresponding to the temperature of the sensor (and, consequently, of the fluid by which stem 3 is surrounded and immersed)

The combination of sensor stem 3 and indicator dial 4 is old in the art of temperature indicators and such combinations are used for sensing and indicating internal temperatures of cooking meats, baked goods, etc. in homes and industry, generally.

In the device proposed here, the sensor stem 3 and indicator dial 4 are fitted to the cover 5 of a convenient oil reservoir access port, as an integral unit of sensor and indicator, referred to as temperature gauge 1.

Cover 5, in a certain class of motorcycle, such as Yamaha 500, XT and TT models, is used to provide protection of the contents of engine lubricating oil reservoir from contaminants. Such a cover is provided with threads 8 which cooperate with those of a boss fitting on the operator's console, as shown in FIG. 1, to provide for adding oil to the engine as the need arises.

At present, on the above types of vehicle, this cover has a dipstick attached to its underside which is used by the operator to determine the need for additional oil as time passes and oil is consumed or lost to the engine.

The temperature sensor stem 3, of this invention has conventional scribe marks thereon, providing a volumetric measurement in conjunction with its primary purpose of temperature monitoring. Length of stem 3 and positioning of scribe marks will, of course, vary with variations of the engines with which it is used. Stem 3 must be of sufficient length to have a portion thereof immersed in the lubricant whose temperature will be transmitted to the sensor through stem 3's casing. Scribe marks are not fundamental to this invention but are an important addition to the value of temperature gauge 1.

This invention provides a circular bore 13 through cover 5, of such depth that gauge body 2 seats on a shoulder 12 of bore 13, with the remainder of gauge body 2 and stem 3 provided a counter bore and passage through the cover respectively. Bore 13 is made to conform, in size and dimension, with gauge body 2 so that said gauge body 2 fits into the bore 13 in good fit fashion. Clearance is not critical, and principal concern is the ability to orient gauge body 2 to any position in the cover 5 before its position is sealed by retention means such as retainer ring 7. Retainer ring 7 is a snap ring type unit, fabricated from a resilient substance such as neoprene, rubber or spring steel and fits closely into groove 6, machined around the upper edge of bore 13.

Other means of retaining gauge body 2 in a fixed position, after manual positioning for optimal visibility by the user, could be used such as set screws between cover 5 and gauge body 2, or permanent attachment of gauge body 2 to resilient plug 15 and reorienting plug 15 for maximum visibility.

In used, indicator gauge 1 is positioned in bore 13, after cover 5 has been tightened into its threaded boss, to provide the vehicle operator maximum ease in reading indicator dial 4. Once cover 5 has been set to its normal use position, and indicator gauge 1 has been oriented for best visibility, retainer ring 7 is snapped into groove 6 and in restraining contact with gauge body 2.

Gasket 9 seals cover 5 to the threaded boss of the oil addition port of lubricant reservoir, preventing fluid or fume leakage from the lubricant reservoir to the atmosphere through the metal to metal seat of cover 5 and the threaded boss.

When cover 5 is secured into its boss, indicator gauge 1 is oriented to its use position and secured in place with retainer ring 7. Cover 5 may then be removed and reinserted (as lubricant is added or after lubricant checks) without distrubing indicator 1, which will then resume maximum visibility orientation within cover 5 when the cover is reseated on its threaded boss.

Stem 3, fabricated, generally, from stainless steel or highly durable material, will serve as a lubricant volume gauge, with the engine turned off, by having calibrated scribe marks at the engine manufactures recommended levels for "Full" and "Add Oil" points as do conventional oil dip-sticks. Length of stem 3 will then vary with the type of vehicle and reservoir with which the indicator gauge 1 is used.

Certain vehicles, wuch as Harley-Davidson motorcycles (reference FIG. 5) and others, have oil reservoir access ports without the threaded bosses used on Yamaha 500 models. Indicator gauge 1 is adaptible for use with these vehicles through a modified cover configuration. For such vehicles, the lubricant reservoir cover comprises a plug 15, fabricated from a resilient substance such as neoprene or rubber and provided with a bored, grooved and counter bored element similar to cover 5, used to contain gauge body 2. Resilient plug 15 will be of such diameter and length that it will fit snugly into the access ports of the reservoirs without threaded bosses. When the plug 15 is inserted into these ports, ridges 10 of the plugs will assist retention of the plug in the port and seal the reservoir, preventing fume and fluid escape therefrom. Gasket 9 may be used on this type of embodiment as well, as that shown in FIG. 6.

In a preferred embodiment of this device, a hexagonal stainless steel element of approximately 1 ¾ inches, flat to flat, was bored, grooved, counter bored, drilled and threaded for use on Yamaha 500 motorcycles. Dial 4, scaled in degrees Fahrenheit, was of nominal 1 ¼ inches diameter and part of a sensor purchased on the open market. Stem 3 of such a sensor was roughly 5 inches long and was scribed, by the inventor, for dipstick use. The face of dial 4 was modified with hazardous operation coloring of temperatures in excess of 210 degrees. Dials can, of course, be purely numeric and have no helper coloring, but the use of solid colored red zones materially assists a busy driver in warning him of over-temperature as the needle 11 moves into a danger zone. The device performs faultlessly in rough and rugged terrain use as well as on highway and freeway speed courses.

Indicator dial 4 should cover a range of temperatures including nominal ambient of the area of usage up to approximately 350° F. Most lubricating oils in common use will have been destroyed or burned at lower temperatures than 350° F. and the user can set his own range of allowed usage temperatures by specially coloring the indicator dial or by establishing a range of numbered degrees acceptable or optimal to him.

Harley Davidson motorcycles, and other vehicles, often have their oil reservoir access ports apart from the operator's console and closer to the engine proper. For the vehicles, variations of the device might well include smaller dials 4 and modified cover 15.

Dune buggies, for example, are often equipped with twiston oil reservoir closures and adaptation of such closures to the orientable gauge of this invention is easily accomplished by using the resilient type plug 15, or a combination of the bores of cover 5 and resilient, rotation restraining means providing for use of sensing stem 3 through the twist-on reservoir closure.

Variations in size and configuration of temperature gauge 1 and oil access port covers 5 and 15 are contemplated by this invention and fall within the scope thereof. As the invention,

I claim:

1. An orientable temperature indicating device for use in monitoring temperature of a fluid in a reservoir having an access port and access port structure, comprising, in combination,
    A. a temperature sensor having an extended stem coupled to an indicator body, and
    B. a fluid reservoir access port cover,
        1. said cover comprising a closure body having an axis of symmetry, a bore, a counterbore, angular orientation restraint means and a sealing surface,
            (a) said bore passing through said closure body along said axis of symmetry and sized to permit passage of the stem of said sensor,
            (b) said counterbore centered along said axis of symmetry and sized to accept said indicator body therein,
            (c) said angular orientation restraint means providing means for selectively fixing said stem and indicator body at an arbitrary angular orientation of said indicator body in said counterbore, irrespective of the position of the closure body whereby said indicator body is positioned for optimal visibility by a user, and
            (d) said sealing surface being configured to cooperate with fluid reservoir access port structure in isolating reservoir contents from particulate contaminants originating in sources external to the reservoir.

2. The device of claim 1 wherein said closure body comprises rigid material and said sealing surface comprises threads cooperating with opposing threads affixed to access port structure.

3. The device of claim 2 wherein a gasket is employed between said closure body and access port structure.

4. An orientable temperature indicating device for use in monitoring temperature of a fluid in a reservoir having an access port and access port structure, comprising, in combination,
    A. a temperature sensor having an extended stem coupled to an indicator body, and
    B. a fluid reservoir access port cover,
        1. said cover comprising a closure body having an axis of symmetry, a bore, a counterbore, angular orientation restraint means and a sealing surface,
            (a) said bore passing through said closure body along said axis of symmetry and sized to permit passage of the stem of said sensor,
            (b) said counterbore centered along said axis of symmetry and sized to accept said indicator body therein,
            (c) angular orientation restraint means to fix said stem and indicator body at an arbitrary angular orientation of said indicator body in said counterbore,
            (d) and said sealing surface being configured to cooperate with fluid reservoir access port structure in isolating reservoir contents from particulate contaminants originating in sources external to the reservoir, and
            (e) said closure body comprising resilient material having a sealing surface of such resiliency that friction coupling between said closure body and access port structure provides isolation of reservoir contents from external particulate contamination.

5. An orientable temperature indicating device for use in monitoring temperature of a fluid in a reservoir having an access port and access port structure, comprising, in combination,
    A. a temperature sensor having an extended stem coupled to an indicator body, and
    B. a fluid reservoir access port cover,
        1. said cover comprising a closure body having an axis of symmetry, a bore, a counterbore, angular orientation restraint means and and a sealing surface,
            (a) said bore passing through said closure body along said axis of symmetry and sized to permit passage of the stem of said sensor,
            (b) said counterbore centered along said axis of symmetry and sized to accept said indicator body therein.
            (c) angular orientation restraint means to fix said stem and indicator body at an arbitrary angular orientation of said indicator body in said counterbore,
            (d) and said sealing surface being configured to cooperate with fluid reservoir access port structure in isolating reservoir contents from particulate contaminants originating in sources external to the reservoir, and
            (e) said angular orientation restraint means comprising the combination of a groove around the inner circumference of said counterbore and a resilient restraining washer, said washer sized to resiliently deform in compression so as to fit into said groove, and sized to have a portion of its width extend beyond said groove, after being seated therein, so that said washer engages both the groove and said indicator body, friction between said washer and said closure body material and between said washer and said indicator body being sufficient to prevent angular motion of said indicator body in said counterbore.

6. An orientable temperature indicating device for use in monitoring temperature of a fluid in a reservoir having an access port and access port structure, comprising, in combination,
    A. a temperature sensor having an extended stem coupled to an indicator body, and
    B. a fluid reservoir access port cover,
        1. said cover comprising a closure body having an axis of symmetry, a bore, a counterbore, angular orientation restraint means and a sealing surface,
            (a) said bore passing through said closure body along said axis of symmetry and sized to permit passage of the stem of said sensor,
            (b) said counterbore centered along said axis of symmetry and sized to accept said indicator body therein,
            (c) angular orientation restraint means to fix said stem and indicator body at an arbitrary angular orientation of said indicator body in said counterbore, (d) and said sealing surface being configured to cooperate with fluid reservoir access port structure in isolating reservoir contents from particulate contaminants originating in sources external to the reservoir, and
(e) the extended stem of the temperature sensor being provided with indicia relating to fluid level.

* * * * *